(12) United States Patent
Burke et al.

(10) Patent No.: US 10,149,151 B2
(45) Date of Patent: Dec. 4, 2018

(54) COMMUNICATION USING VIRTUAL NUMBERS (71) Applicant: HEWLETT PACKARD ENTERPRISE DEVELOPMENT LP, Houston, TX (US)

(72) Inventors: Paul Michael Burke, Bedford, NH (US); Rob W. Heldenbrand, Omaha, NE (US); Ruben Rodriguez Alvarez, Palo Alto, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

(21) Appl. No.: 15/543,683

(22) PCT Filed: Jan. 30, 2015

(86) PCT No.: PCT/US2015/013848
§ 371 (c)(1),
(2) Date: Jul. 14, 2017

(87) PCT Pub. No.: WO2016/122617
PCT Pub. Date: Aug. 4, 2016

(65) Prior Publication Data
US 2018/0014183 A1    Jan. 11, 2018

(51) Int. Cl.
*H04W 40/00* (2009.01)
*H04W 8/26* (2009.01)
(Continued)

(52) U.S. Cl.
CPC ............ *H04W 8/26* (2013.01); *H04L 65/105* (2013.01); *H04L 65/1006* (2013.01);
(Continued)

(58) Field of Classification Search
CPC .......... H04W 8/26; H04W 8/12; H04W 4/16; H04W 4/02; H04W 80/10; H04W 84/042;
(Continued)

(56) References Cited

U.S. PATENT DOCUMENTS 8,369,311 B1 * 2/2013 Kirchhoff ......... H04M 3/42263
370/352
8,428,647 B2   4/2013 Lim et al.
(Continued)

FOREIGN PATENT DOCUMENTS

KR    1020120035580 A    4/2012

OTHER PUBLICATIONS

Blackberry, "SIP Gateway Process Flow: Receiving a PBX-initiated Call on a Blackberry Device from an External Number" pp. 1-2 [online], Retrieved from the Internet on Dec. 29, 2014 at URL: <http://docs.blackberry.com/en/admin/deliverables/30622/PF_BBMVS_receiving_a_call_on_a_BB_device_GW_1319880_11.jsp>.
(Continued)

*Primary Examiner* — Amancio Gonzalez
(74) *Attorney, Agent, or Firm* — Michael A. Dryja (57) ABSTRACT

Examples disclosed herein involve receiving a request from a calling device to establish a communication session between a mobile device and the calling device, the mobile device assigned a virtual telephone number, retrieving location information corresponding to a location of the mobile device from a location register, and sending a redirect to a session border controller (SBC) to establish the communication session between the calling device and the mobile device based on the location information.

13 Claims, 6 Drawing Sheets

(51) Int. Cl.
| | |
|---|---|
| *H04W 80/10* | (2009.01) |
| *H04W 4/02* | (2018.01) |
| *H04W 4/16* | (2009.01) |
| *H04L 29/08* | (2006.01) |
| *H04L 29/06* | (2006.01) |
| *H04M 15/00* | (2006.01) |
| *H04W 4/24* | (2018.01) |
| *H04M 7/00* | (2006.01) |
| *H04W 8/12* | (2009.01) |
| *H04M 3/42* | (2006.01) |
| *H04W 84/04* | (2009.01) |

(52) U.S. Cl.
CPC ...... *H04L 65/1069* (2013.01); *H04L 65/1073* (2013.01); *H04L 67/141* (2013.01); *H04L 67/2814* (2013.01); *H04M 7/006* (2013.01); *H04M 15/67* (2013.01); *H04M 15/8033* (2013.01); *H04M 15/8038* (2013.01); *H04M 15/8044* (2013.01); *H04M 15/8055* (2013.01); *H04M 15/8061* (2013.01); *H04M 15/8228* (2013.01); *H04W 4/02* (2013.01); *H04W 4/16* (2013.01); *H04W 4/24* (2013.01); *H04W 8/12* (2013.01); *H04W 80/10* (2013.01); *H04M 3/42008* (2013.01); *H04M 3/42229* (2013.01); *H04M 3/42306* (2013.01); *H04W 84/042* (2013.01)

(58) Field of Classification Search
CPC ............. H04M 3/42229; H04M 7/006; H04M 3/42306; H04L 65/1006; H04L 67/141
USPC ........................................................ 455/445
See application file for complete search history.

(56) References Cited

U.S. PATENT DOCUMENTS

| | | | |
|---|---|---|---|
| 8,606,267 | B2 | 12/2013 | Chandan et al. |
| 8,817,777 | B2* | 8/2014 | Manian ................. H04L 12/589 370/352 |
| 2005/0003805 | A1* | 1/2005 | Zaffino .................... H04L 29/06 455/414.1 |
| 2005/0096022 | A1 | 5/2005 | Florkey et al. |
| 2008/0305803 | A1 | 12/2008 | Long et al. |
| 2009/0041225 | A1 | 2/2009 | Agarwal et al. |
| 2011/0058544 | A1 | 3/2011 | Sardesai et al. |
| 2011/0249666 | A1 | 10/2011 | Holbrook et al. |
| 2012/0143982 | A1 | 6/2012 | Oster et al. |
| 2014/0126570 | A1 | 5/2014 | Olrog |

OTHER PUBLICATIONS

International Search Report and Written Opinion, International Application No. PCT/US2015/013848, dated Oct. 29, 2015, pp. 1-11, KIPO.

Extended European Search Report, EP Application No. 15880507.7, dated Jan. 18, 2018, pp. 1-9, EPO.

* cited by examiner

COMMUNICATION USING VIRTUAL NUMBERS

BACKGROUND

Wireless communication has afforded consumers increased access to information and services. Cellular networks operated by service providers are connected to the Public Switch Telephone Network (PSTN) to enable communication between various types of mobile devices and landline (wired) devices. Routable telephone numbers may be assigned to each device to communicate with one another via the PSTN.

Virtual telephone numbers (e.g., non-geographical telephone numbers) are telephone numbers associated with a country but not to any particular location within that country. For example, certain numbering plans (e.g., the North American Numbering Plan) may reserve virtual telephone numbers (e.g., telephone numbers with 5XX area codes) for these purposes.

Various types of mobile devices (e.g., smartphones, tablets, mobile broadband devices, telematics devices, etc.) may have various uses for a communications network. For example, certain services may involve more frequent communication over a communication network (e.g., the Public Switched Telephone Network) than others. More specifically, mobile phone services may use a communication network more frequently than alarm system services due to the inherent purposes of the respective services (e.g., to facilitate communication between users versus to communicate a breach in a secured location).

BRIEF DESCRIPTION OF THE DRAWINGS

Wherever possible, the same reference numbers will be used throughout the drawing(s) and accompanying written description to refer to the same or like parts.

DETAILED DESCRIPTION

Examples disclosed herein involve routing call terminations to mobile devices using virtual numbers without routing the calls through a public switched telephone network (PSTN). In examples disclosed herein, a session initiation protocol (SIP) gateway may determine location information for contacting a mobile device in response to receiving an SIP invite initiated by dialing a virtual number. A service provider may use the SIP gateway to establish the communication session between a calling device (e.g., a client device) without using the PSTN. Example communication sessions may be established using SIP and/or handled using real-time transfer protocol (RTP) via switches or session border controllers of the service provider.

In mobile networks (e.g., cellular networks) mobile devices may connect to service provider networks (e.g., a network of access points, cellular towers, gateways, session border controllers, mobile switching centers, etc.) by contacting a radio access network (RAN) of the service provider. The mobile device may then land on a serving mobile switching center (MSC) of the service provider that handles or routes calls to the mobile device based on its location or serving access point. Mobile devices assigned a routable telephone number may connect to a network via a gateway mobile switching center, which is an entry point to the mobile network of the service provider for a PSTN.

Routable numbers are issued to service providers for assignment to mobile devices. With such an increase of mobile devices reaching the market in recent years, routable numbers may become exhausted. Additionally, service providers pay fees to a government agency to lease routable numbers assigned to mobile devices receiving service via the service provider. On the other hand, virtual numbers (or non-routable numbers or non-geographical numbers) are not associated with any lease fees and may provide relief from the exhaustion of routable numbers. Virtual numbers can be used to route a call termination to a routable number assigned by a government agency via a PSTN. Examples disclosed herein involve routing calls to mobile devices using a virtual number with routing the call through a PSTN. Rather, a service provider (or any other entity for routing communication sessions) may route a call between devices using SIP and RTP communication, as disclosed below.

An example method includes receiving a request from a calling device to establish a communication session between a mobile device and the calling device, the mobile device assigned a virtual telephone number, retrieving location information corresponding to a location of the mobile device from a location register, and sending a redirect to a session border controller (SBC) to establish the communication session between the calling device and the mobile device based on the location information. An example apparatus includes a request receiver to receive a request to establish a communication link between a calling device and a mobile device, the request comprising a virtual number assigned to the mobile device, a location retriever to retrieve a location of the mobile device from a location register of a service provider, and a redirect generator to send a redirect to a session border controller of the service provider to establish the communication link between the calling device and the mobile device.

As used herein, a routable number is a number that is issued to a device for communication via a PSTN or a PLMN using standard routing schemes via these networks. For example, within the United States, a routable number is a 10-digit (e.g., xxx-xxx-xxxx) number including a 3 digit area code along with an optional country code for calls within the United States. As used herein a virtual number, which may be referred to herein interchangeably as a non-routable number, is a non-geographical telephone number associated with a country but not to a location within that country. As used herein, a communication session may be any type of temporary or permanent interaction between at least two devices via any type or any number of wired communication link(s) or wireless communication link(s) to send data (e.g., voice, text, etc.) or information between one another.

Figure 1:
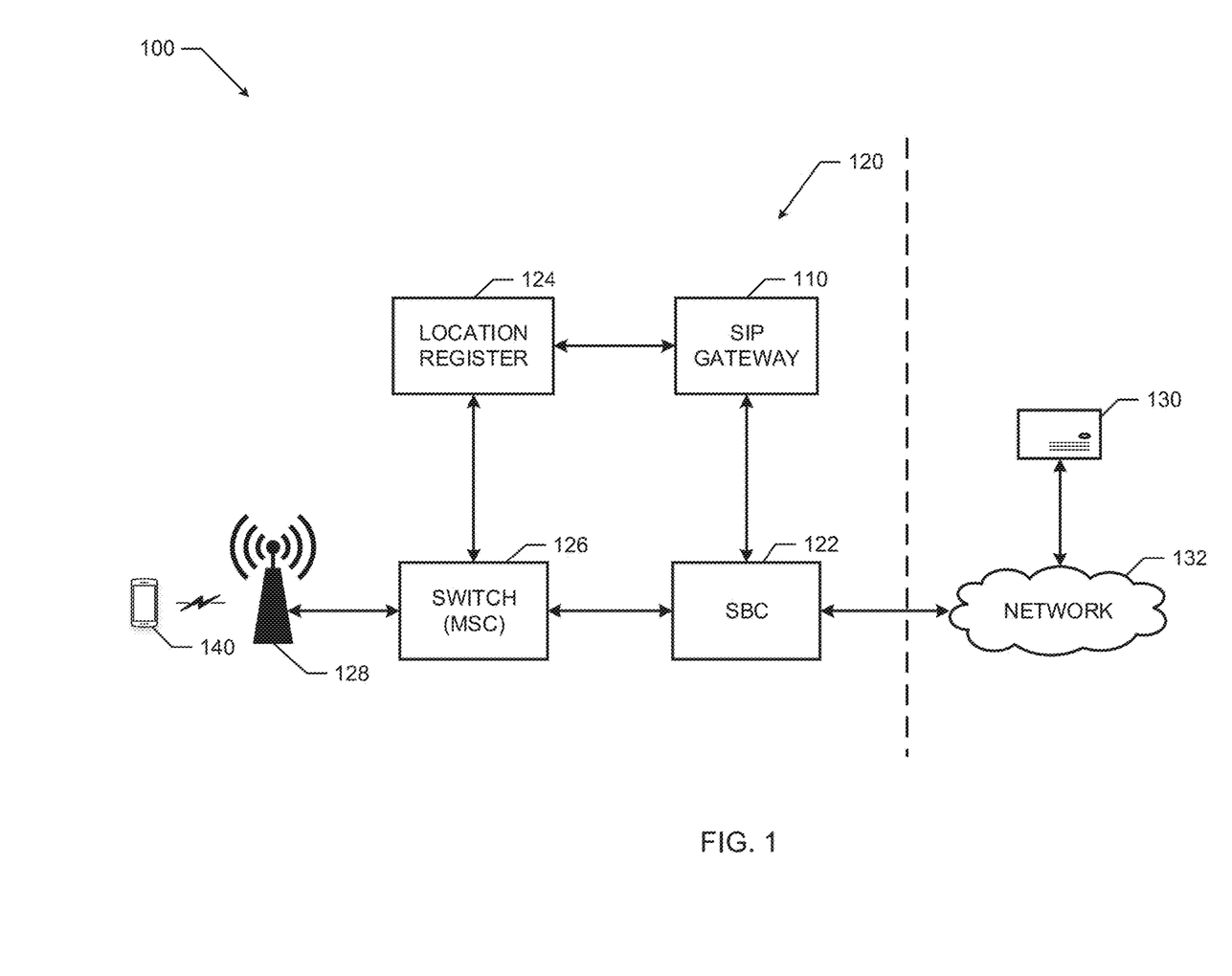
FIG. 1 illustrates a schematic diagram of an example communication system that may be implemented in accordance with an aspect of this disclosure.

FIG. 1 is a schematic illustration of an example communication system 100 including a session initiation protocol (SIP) gateway 110. The example SIP gateway 110 of FIG. 1 is located in a service provider 120 (illustrated on left most side of the dotted line). The example service provider 120 may provide communication service(s) to a client 130. In the illustrated example of FIG. 1, the service provider 120 provides communication service to the client 130 through a session border controller 122 via a network 132. The example network 132 may include any type of network (e.g., a local area network (LAN), a wide area network (WAN), the Internet, etc.) or a dedicated communication link (e.g., a data trunk). In examples disclosed herein, the service provider 120 of FIG. 1 provides communication services to establish a communication session between the client 130 and a mobile device 140

The example client 130 of FIG. 1 may be an enterprise server (e.g., an SIP private branch exchange (PBX)). For example, the client 130 may be operated by an entity that utilizes the service provider network 120 to communicate with customers. More specifically, the client 130 may offer security services, automobile (e.g., safety, navigation, etc.) services, emergency services (e.g., medical emergency), etc. Accordingly, the example client 130 of FIG. 1 may serve multiple customers utilizing communication provided by the service provider 120. In examples disclosed herein, the client 130 may send requests (e.g., SIP invites) to communicate with the mobile device 140. The example mobile device 140 may be any communication device capable of communicating with the service provider 120 to provide services offered by the client 130.

The example service provider 120 of FIG. 1 includes a SBC 122, a location register 124, a mobile switching center (MSC) 126, an access point 128, and the SIP gateway 110. In the illustrated example of FIG. 1, the mobile device 140 accesses the service provider 120 via the access point 128. The access points 128 may be one or many access points of a communication network (e.g., a cellular network) of the service provider 120. For example, the access point may be a cell tower (or base station) of a network of the service provider 120. Example communication networks/services of the service provider 120 may include Global System for Mobile (GSM) communication services, Code Division Multiple Access (CDMA) communication services, long-term evolution (LTE) communication services, etc. For example, the service provider 120 may provide 3G services, 4G services (e.g., 4G LTE), or any other type of mobile communication service.

In examples disclosed herein, the mobile device 140 of FIG. 1 is assigned a virtual telephone number for call termination. Accordingly, the mobile device 140 may not be accessible via a public switched telephone network (PSTN) or public land mobile network (PLMN) using standard protocols of the PSTN or PLMN, respectively. The example mobile device 140 may connect to the access point 128 or network of the service provider upon startup of the mobile device 140 (e.g., when powered on, etc.), when the mobile device 140 comes within range of the access point 128, when a radio of the mobile device 140 is powered on, etc. Upon connecting to the access point 128, the MSC 126 may provide location information corresponding to the mobile device 140 to the location register 124 to register the location of the mobile device 140. For example, as an SIP enabled MSC and the serving MSC of the mobile device 140 (i.e., the MSC currently handling communication for the mobile device 140), the MSC 126 may provide an internet protocol (IP) address of the MSC 126 and a temporary location directory number (TLDN) assigned to the mobile device 140 to the location register 124 for registration. If the mobile device 140 were to connect to a different access point of the network (e.g., the mobile device 140 is no longer in range of the access point 128 or becomes within range of the different access point) of the service provider 120, the MSC 126 and the location register 124 update the location information corresponding to the new location of the mobile device 140, accordingly.

The location register 124 may include a home location register (HLR), a visitor location register (VLR), a home subscriber server (HSS), or any other type of register to register a location of a mobile device. The example location register 124 may receive location information form the MSC 126 to store the location of the mobile device 140. In some examples, the location register 124 may query the MSC 126 or receive a TLDN from the MSC 126 corresponding to the mobile device 140. The TLDN may be used by the service provider 120 to route calls to the mobile device 140 based on its location or its connection to the access point 128.

In the illustrated example of FIG. 1, the location register 124 communicates with the SIP gateway 110. In some examples, the location register 124 may communicate with the SIP gateway 110 via Signaling System Number 7 (SS7) communication protocol (e.g., IS-41 protocol). The location register 124, in examples disclosed herein, may receive requests for location information from the SIP gateway 110 to determine a location or area of the mobile device 140 (e.g., an area surrounding the access point 128). More details of example communication between the location register 124 and the SIP gateway 110 are further described below in connection with FIGS. 2 and 3.

The SBC 122 of FIG. 1 is communicatively coupled with the client 130 via the network 132. The SBC 122, in examples disclosed herein, receives SIP invites (e.g., virtual telephone number calls) from the client 130 to contact the mobile device 140 of FIG. 1. The example SBC 122 may allow SIP signaling (e.g., by providing a Back to Back User Agent (B2B UA) function) to traverse firewalls of the service provider 120. In examples disclosed herein, the SBC 122 communicates (coordinates) with the SIP gateway 110 to establish a communication session between the client 130 and the mobile device 140. The SBC 122 may facilitate establishing the communication session as part of a communication link including the client 130, the MSC 126, the access point 128, and the mobile device 140.

The example SIP gateway 110 of FIG. 1 serves as a gateway to establish a communications session (e.g., an SIP communication session) between the mobile device 140 and the client 130. Accordingly, in examples disclosed herein, the SIP gateway 110 may route a call termination to a mobile device (e.g., the mobile device 140) via a virtual telephone number call. Although the SIP gateway 110 of FIG. 1 is illustrated as a separate component of the service provider 120, in some examples, the SIP gateway 110 may be included within the location register 124 or the SBC 122 of FIG. 1. In other words, the SIP gateway 110 may be partially or entirely collocated with or within the location register 124 or the SBC 122.

Figure 2:
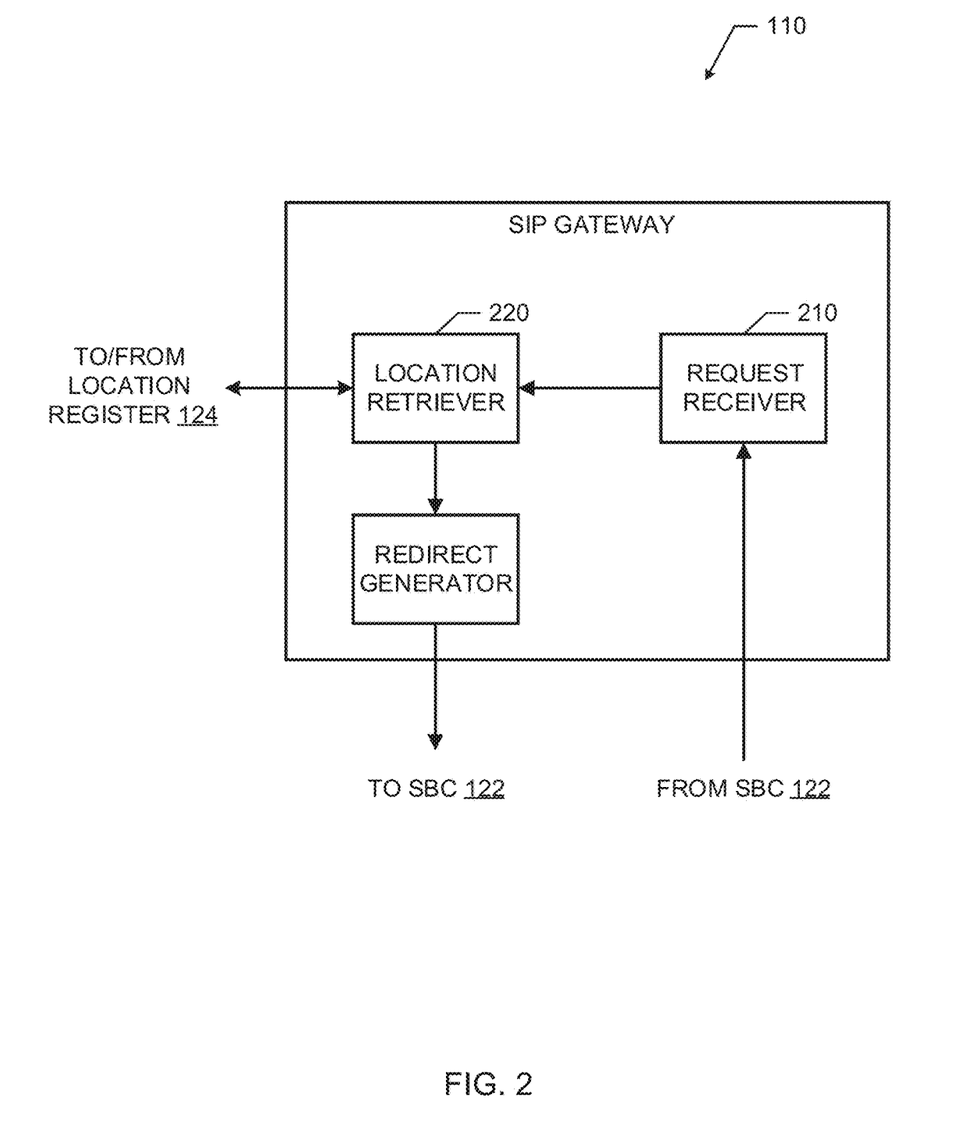
FIG. 2 a block diagram of an example session initiation protocol (SIP) gateway that may be implemented by the communication system of FIG. 1 in accordance with an aspect of this disclosure.

FIG. 2 is a block diagram of an example SIP gateway 110 that may be used to implement the SIP gateway of FIG. 1. The example SIP gateway 110 of FIG. 2 includes a request receiver 210, a location retriever 220, and a redirect generator 230. The SIP gateway 110 of FIG. 2 facilitates establishing a communication session between a client (e.g., the client 130) and a mobile device (e.g., the mobile device 140). In examples disclosed herein, the SIP gateway 110 communicates with a location register (e.g., the location register 124) and an SBC (e.g., the SBC 122) to generate a redirect for connecting the client to the mobile device (e.g., by terminating a call from the client 130 to the mobile device 140).

In examples herein, the request receiver 210 of FIG. 2 receives requests (e.g., a SIP invite) from the client 130 via the SBC 122 to establish a communication session with the mobile device 140. For example, the SBC 122 may have received the request from the client 130 of FIG. 1 and based on a virtual number (e.g., a virtual number assigned to the mobile device 140) included in the request, forwarded the request to the SIP gateway 110. In other words, the SBC 122 may identify that a virtual number was dialed by the client 130, which indicates that the SIP gateway 110 is to facilitate establishing the communication session between the mobile device 140 and the client 130. The example request receiver 210 of FIG. 2 receives the request (e.g., SIP invite) and parses the request to determine identification information for the target device (the mobile device 140). The request receiver 210 may then send the parsed identification information to the location retriever 220.

The example location retriever 220 of FIG. 2 retrieves or receives location information of a target device (e.g., the mobile device 140) from the location register 124 of FIG. 1. In some examples, the location retriever 220 issues SS7 or IS-41 requests to the location register 124 for information (e.g., access point location information, MSC location information etc.) to determine an identity of a serving MSC (e.g., the MSC 126) of the mobile device 140 along with a TLDN for contacting the mobile device 140. The example location register 124 may provide the location retriever 220 (or allow the location retriever 220 to retrieve) with the location information. The location retriever 220 then provides the location information (e.g., the identification information of the MSC 126 and a TLDN for contacting the mobile device 140) to the redirect generator 230.

The example redirect generator 230 of FIG. 2 creates a response to the request (SIP invite) using the retrieved location information from the location retriever 220. For example, the redirect generator 230 may generate a response including an IP address of the MSC 126 and the TLDN. The redirect generator 230 issues an SIP response back to the SBC 122 including the generated response. Based on the received SIP response, the SBC 122 may reissue an SIP invite (or other request) to the MSC 126 to establish a communication between the client 130 and the mobile device 140 via the MSC 126 and the SBC 122. The MSC 126 may then establish the communication session (e.g., by connecting the call) using the TLDN. In examples disclosed herein, the established communication session (e.g., established via SIP communications) between the client 130 and the mobile device 140 may use real-time transport (RTP) protocol.

In some examples, the SIP gateway 110 of FIG. 1 or 2 maintains an authorization database that may be cross referenced upon receipt of an SIP invite. The example authorization database may include a list of authorized entities that are authorized to communicate with particular mobile devices, such as a whitelist. For example, the client 130 may be included in an authorization list that indicates that the client 130 is authorized to contact the mobile device 140. If an entity (e.g., an unauthorized client) attempts to contact the mobile device 140 but is not on an authorization list for contacting the mobile device 140 or a set of mobile devices associated with the mobile device 140 (e.g., a set of mobile devices that provide services offered by the client 130), the request receiver 210 of the SIP gateway 110 may deny the request. In some examples, the authorization database may be maintained, utilized, or monitored by the SBC 122. In such examples, the SBC 122 may accept or deny requests to establish communication sessions based on whether requesting clients are authorized to contact target mobile devices. For the sake of the examples disclosed herein, the client 130 is on an authorization list maintained by the SIP gateway 110 or the SBC 122 and is authorized to contact the mobile device 140.

While an example manner of implementing the SIP gateway 110 of FIG. 1 is illustrated in FIG. 2, at least one of the elements, processes and/or devices illustrated in FIG. 2 may be combined, divided, re-arranged, omitted, eliminated and/or implemented in any other way. Further the request receiver 210, the location retriever 220, the redirect generator 230, or, more generally, the example SIP gateway 110 of FIG. 2 may be implemented by hardware and/or any combination of hardware and executable instructions (e.g., software and/or firmware). Thus, for example, any of the request receiver 210, the location retriever 220, the redirect generator 230, or, more generally, the example SIP gateway 110 could be implemented by at least one of an analog or digital circuit, a logic circuit, a programmable processor, an application specific integrated circuit (ASIC), a programmable logic device (PLD) and/or a field programmable logic device (FPLD). When reading any of the apparatus or system claims of this patent to cover a purely software and/or firmware implementation, at least one of the request receiver 210, the location retriever 220, or the redirect generator 230 are hereby expressly defined to include a tangible computer readable storage device or storage disk such as a memory, a digital versatile disk (DVD), a compact disk (CD), a Blu-ray disk, etc. storing the executable instructions. Further still, the example SIP gateway 110 of FIG. 2 may include at least one element, process, and/or device in addition to, or instead of, those illustrated in FIG. 2, and/or may include more than one of any or all of the illustrated elements, processes and devices.

Figure 3:
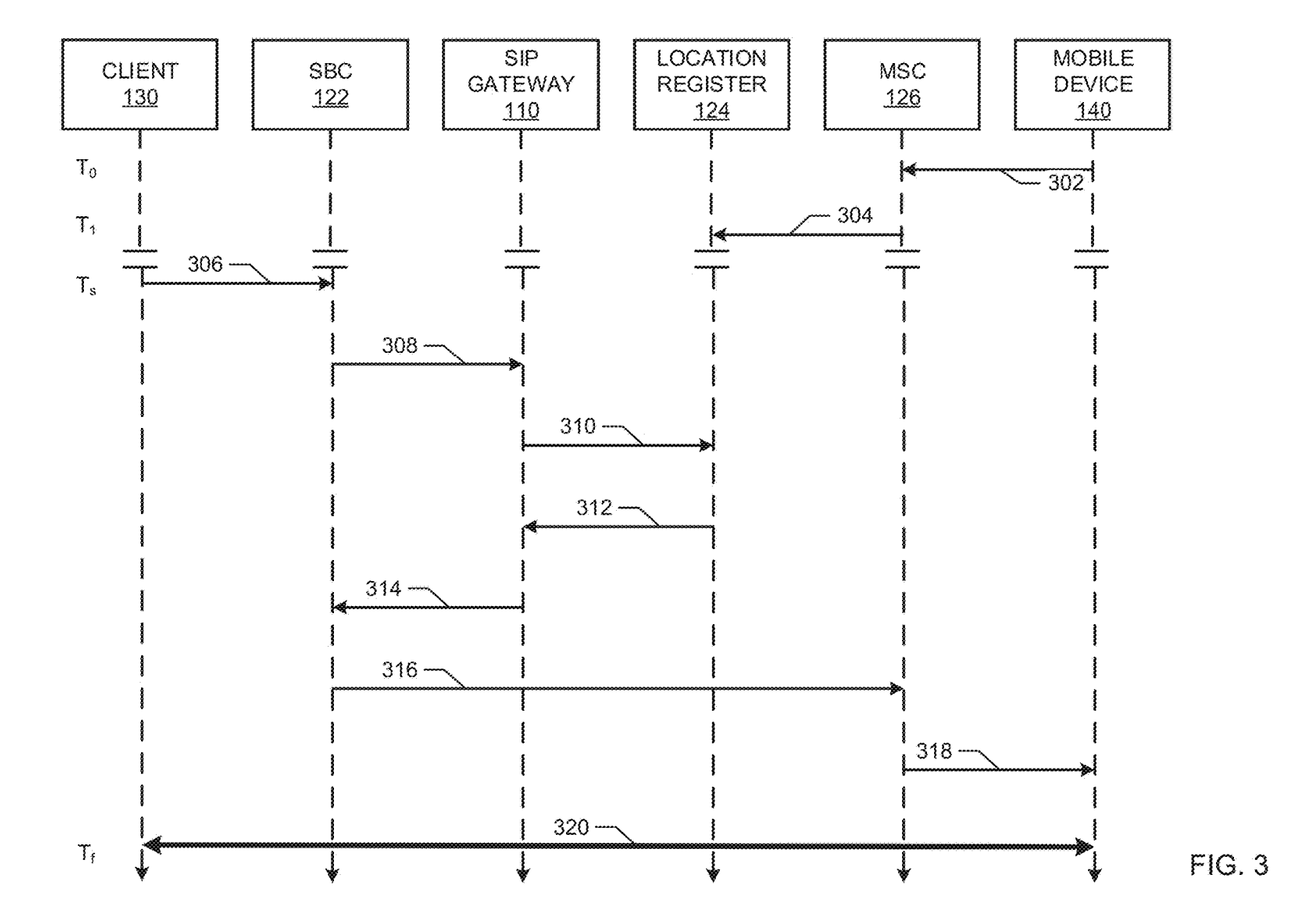
FIG. 3 is a communication diagram representative of an example sequence of communications that may be sent within the example communication system of FIG. 1 in accordance with an aspect of this disclosure.

FIG. 3 is a communication diagram representative of an example sequence of communications that may be sent within the example communication system 100 of FIG. 1. The sequence of communications of FIG. 3 are representative of communications that may establish a communication session between the client 130 and the mobile device 140 of FIG. 1. Communications (e.g., signaling) illustrated in the example communication diagram 300 of FIG. 3 are sent between an SIP gateway 110, a SBC 122, a location register 124, a MSC 126, a client 130, and a mobile device 140, which are representative of the respective components of the communication system 100 of FIG. 1. The example communications (302-320) of FIG. 3 are sent/received between time $T_0$ and $T_1$ and between $T_s$ and $T_f$, denoted by the dotted lines. Each communication 302-320 may include or represent a single communication interaction (e.g., a message, a redirect, a request, a SIP invite, a response, an acknowledgement, a beacon, a ping, etc.), a plurality of communications, or a communication session.

In FIG. 3, at time $T_0$, the mobile device 140 connects to the MSC 126 via communication 302 (e.g., via standard signaling protocols to access an RAN). The communication 302 may include a communication with an access point (e.g., the access point 128) between the mobile device 140 and the MSC 126. The mobile device 140 initiate communication 302 with the MSC 126 upon powering on, activating a radio, coming within range of an access point in communication with the MSC 126, etc. Upon connection with the mobile device 140 via communication 302, the MSC 126 may register location information (e.g., a TLDN, an address, such as an IP address, of the MSC 126, etc.) with the location register 124 via communication 304. In FIG. 3, communication 304 occurs at time $T_1$. After time $T_1$, a period of time may pass (denoted by the break in the dotted lines) until time $T_s$ when communication 306 occurs.

In FIG. 3, the client 130 sends an SIP invite (communication 306) to the SBC 122 to establish a communication session with the mobile device 140. For example, the communication 306 may be initiated by dialing (or calling) a virtual number assigned to the mobile device 140. The communication 306 may be directed to the SBC 122 based on the virtual number in the SIP invite. In FIG. 3, the SBC 122 forwards the SIP invite (communication 308) to the SIP gateway 110. The SBC 122 may forward the SIP invite to the SIP gateway based on the virtual number included in the SIP invite.

In FIG. 3, upon receipt of the SIP invite from the SBC, the SIP gateway 110 may request (communication 310) location information from the location register 124. In some examples, the communication 310 may include an SS7 request (e.g., an IS-41 request). In FIG. 3, the location register 124 provides the requested location information (e.g., an IP address of the MSC and a TLDN assigned to the mobile device 140) to the SIP gateway 110 via communication 312. The location information provided by the location register 124 of FIG. 3 may be the same location information that was registered at time $T_1$ based on communication 304 from the MSC 126 to the location register 124, if the MSC 126 is still the serving MSC of the mobile device 140.

In the illustrated example of FIG. 3, the SIP gateway 110 sends a redirect (communication 314) to the SBC 122 including the location information to facilitate establishing a communication session between the client 130 and the mobile device 140 via the MSC 126 and the SBC 122. The SBC 122, in response to receiving the redirect (communication 314), reissues a SIP invite (communication 316) to the MSC 126. The MSC 126, in FIG. 3 then connects the call (from the original SIP invite) to the mobile device 140 via communication 318. At communication 320 of FIG. 3, a communication session (e.g., a RTP communication) is established between the mobile device 140 and the client 130. In examples disclosed herein, the communication 320 may include communications between the mobile device 140, the MSC 126, the SBC 122, and the client device 130 as well as other devices or elements (e.g., the access point 128 or the network 132).

Figure 4:
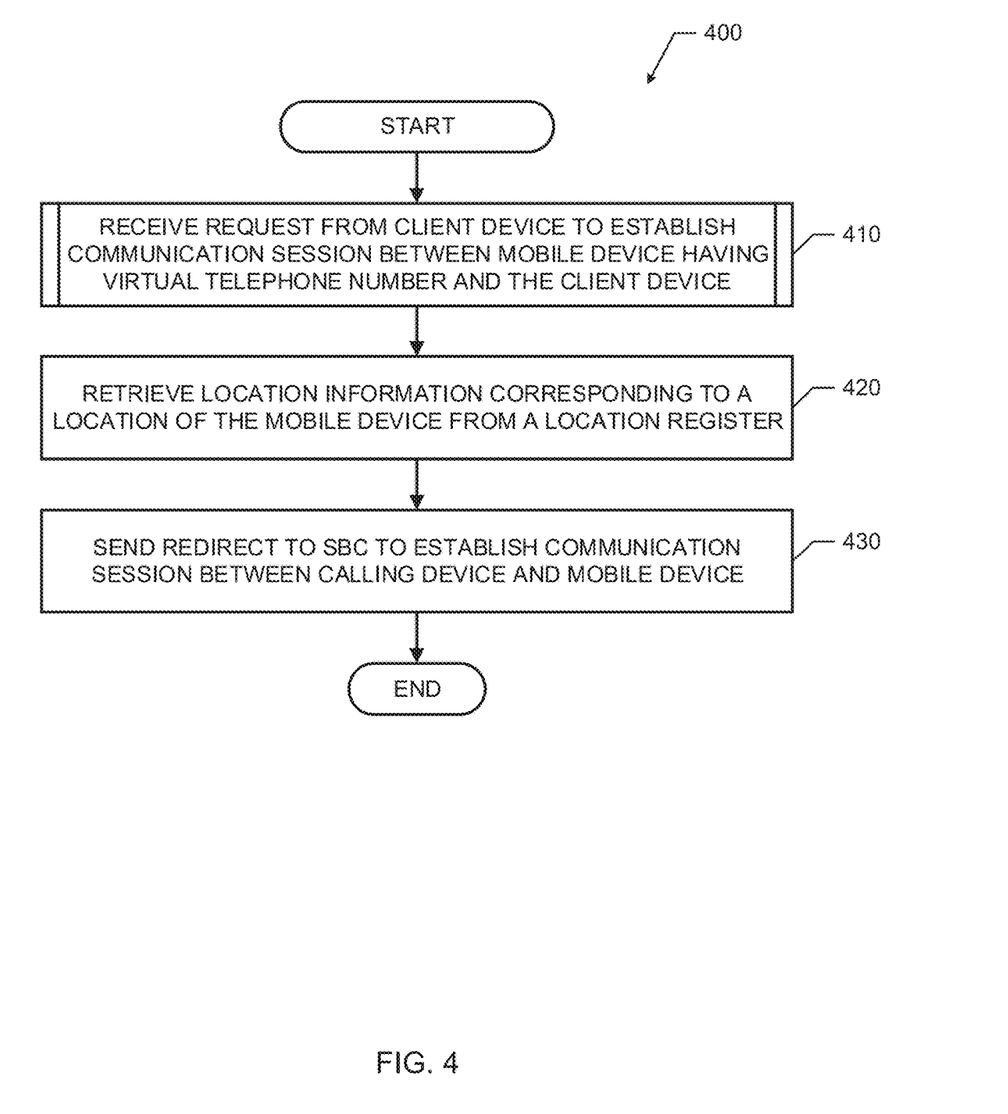
FIG. 4 is a flowchart representative of example machine readable instructions that may be executed to implement the SIP gateway of FIG. 2.
Figure 5:
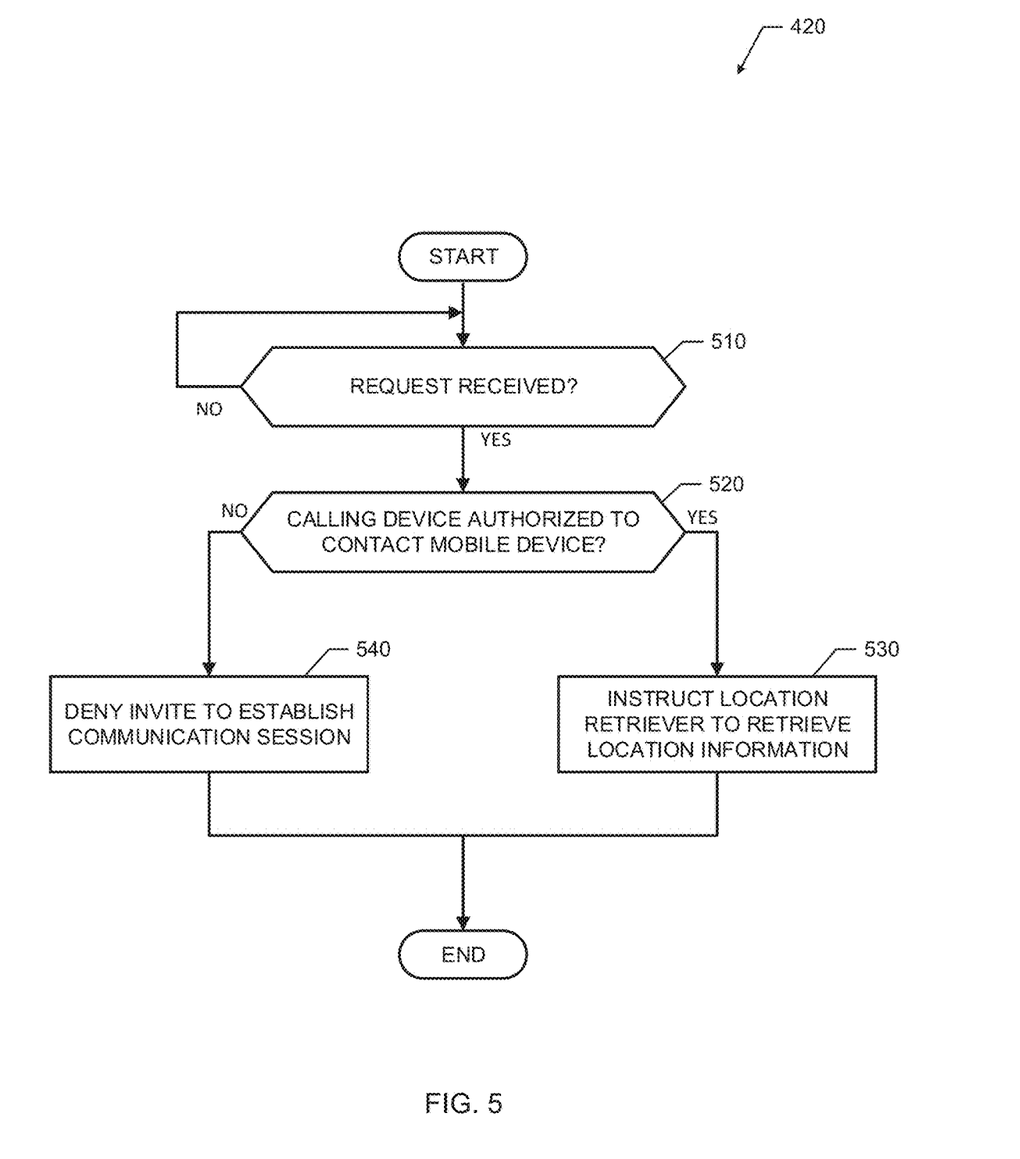
FIG. 5 is a flowchart representative of an example portion of the example machine readable instructions of FIG. F1 to implement the A1 of FIG. B.

Flowcharts representative of example machine readable instructions for implementing the SIP gateway 110 of FIG. 2 are shown in FIGS. 4 and 5. In this example, the machine readable instructions comprise a program(s)/process(es) for execution by a processor such as the processor 612 shown in the example processor platform 600 discussed below in connection with FIG. 6. The program(s)/process(es) may be embodied in executable instructions (e.g., software) stored on a tangible computer readable storage medium such as a CD-ROM, a floppy disk, a hard drive, a digital versatile disk (DVD), a Blu-ray disk, or a memory associated with the processor 612, but the entirety of the program(s)/process(es) and/or parts thereof could alternatively be executed by a device other than the processor 612 and/or embodied in firmware or dedicated hardware. Further, although the example program(s)/process(es) is/are described with reference to the flowcharts illustrated in FIG. 4 or 5, many other methods of implementing the example SIP gateway 110 may alternatively be used. For example, the order of execution of the blocks may be changed, and/or some of the blocks described may be changed, eliminated, or combined.

The process 400 of FIG. 4 begins with an initiation of the SIP gateway 110 (e.g., upon startup, upon installation/activation within the service provider 120, upon startup of a device implementing the SIP gateway 110 (e.g., the location register 124, the SBC 122, etc.), etc.). The example process 400 may be executed to establish a communication session between the client 130 and the mobile device 140 using a virtual (or non-routable) telephone number. At block 410 of FIG. 4, the request receiver 210 receives a request (e.g., an SIP invite) from the client 130 (e.g., a calling device, such as an enterprise SIP PBX) to establish a communication session between the mobile device 140 and the client 130. In examples disclosed herein, the example request of block 410 may be received/forwarded from the SBC 122, which received the request from the client 130.

At block 420 of the example process 400 of FIG. 4, the location retriever 220 retrieves (or receives) location information (e.g., an IP address of the MSC 126, a TLDN assigned to the mobile device 140, etc.) corresponding to a location of the mobile device 140 from the location register 124. In some examples, the location retriever 220 may use SS7 communication protocol (e.g., IS-41) to request and receive the location information from the location register 124. At block 430, the redirect generator 430 sends a redirect to establish a communication session between the calling device and the mobile device using the location information. In examples disclosed herein, the SBC 122 uses the redirect to reissue an SIP invite comprising the location information. After block 430, the process 400 of FIG. 4 ends. However, in examples disclosed herein, after block 430, the client device 130 and the mobile device 140 may communicate with one another via SIP or RTP as a result of actions by the SIP gateway 110 or executing the process 400 to implement the SIP gateway 110.

The process 500 of FIG. 5 begins with an initiation of the SIP gateway 110 or the request receiver 210 of FIG. 2. The example process 500 may be executed to confirm that a calling or requesting client (e.g., the client 130) is authorized to contact a particular mobile device (e.g., the mobile device 140) using a virtual (or non-routable) telephone number. In some examples, the process 500 may be executed to implement block 410 of FIG. 4. In some examples, the SBC 122 may execute the example process 500. At block 510, the request receiver 210 determines whether a request (e.g., an SIP invite) has been received from the client 130 (or any other client). If no request has been received, control returns to block 510 and the request receiver 210 continues to monitor for received requests.

If a request has been received at block 510, the request receiver 210 determines whether the requesting client 130 is authorized to contact the mobile device 140 (block 520). For example, at block 520, the request receiver 210 may confirm that the client 130 is on an authorization list for calling the mobile device 140 (or other mobile devices) via a virtual telephone number. If the client 130 is authorized to contact the mobile device 140 (block 520), the request receiver 210 may instruct the location retriever 220 to retrieve the location information of the mobile device 140 from the location register 124. After block 530, the process 500 ends (e.g., control may advance to block 420 of FIG. 4). If the client 130 is not authorized to contact the mobile device 140 (at block 520), the request receiver 210, at block 540, may deny the invite to establish the communication session between the client 130 and the mobile device 140. For example, at block 540, the request receiver 210 may reply to the SBC 122 or client 130 indicating that such request is denied or cannot be completed. After block 540, the process 500 ends. In some examples, where process 500 is executed to implement block 410, after block 540, the process 400 ends.

As mentioned above, in some examples, the process 500 or a similar process may be executed by the SBC 122 to determine whether requests (e.g., SIP invites) are to be forwarded to the SIP gateway or not. For example, if the SBC 122 determines that a client is not on an authorization list to contact the SIP gateway 110, the request may be denied by the SBC 122. Accordingly, the SBC 122 or the SIP gateway 110 may monitor or authorize client requests.

As mentioned above, the example process(es) of FIG. 4 or 5 may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals and to exclude transmission media. As used herein, "tangible computer readable storage medium" and "tangible machine readable storage medium" are used interchangeably. Additionally or alternatively, the example process(es) of FIG. 4 or 5 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. As used herein, when the phrase "at least" is used as the transition term in a preamble of a claim, it is open-ended in the same manner as the term "comprising" is open ended. As used herein the term "a" or "an" may mean "at least one," and therefore, "a" or "an" do not necessarily limit a particular element to a single element when used to describe the element. As used herein, when the term "or" is used in a series, it is not, unless otherwise indicated, considered an "exclusive or."

Figure 6:
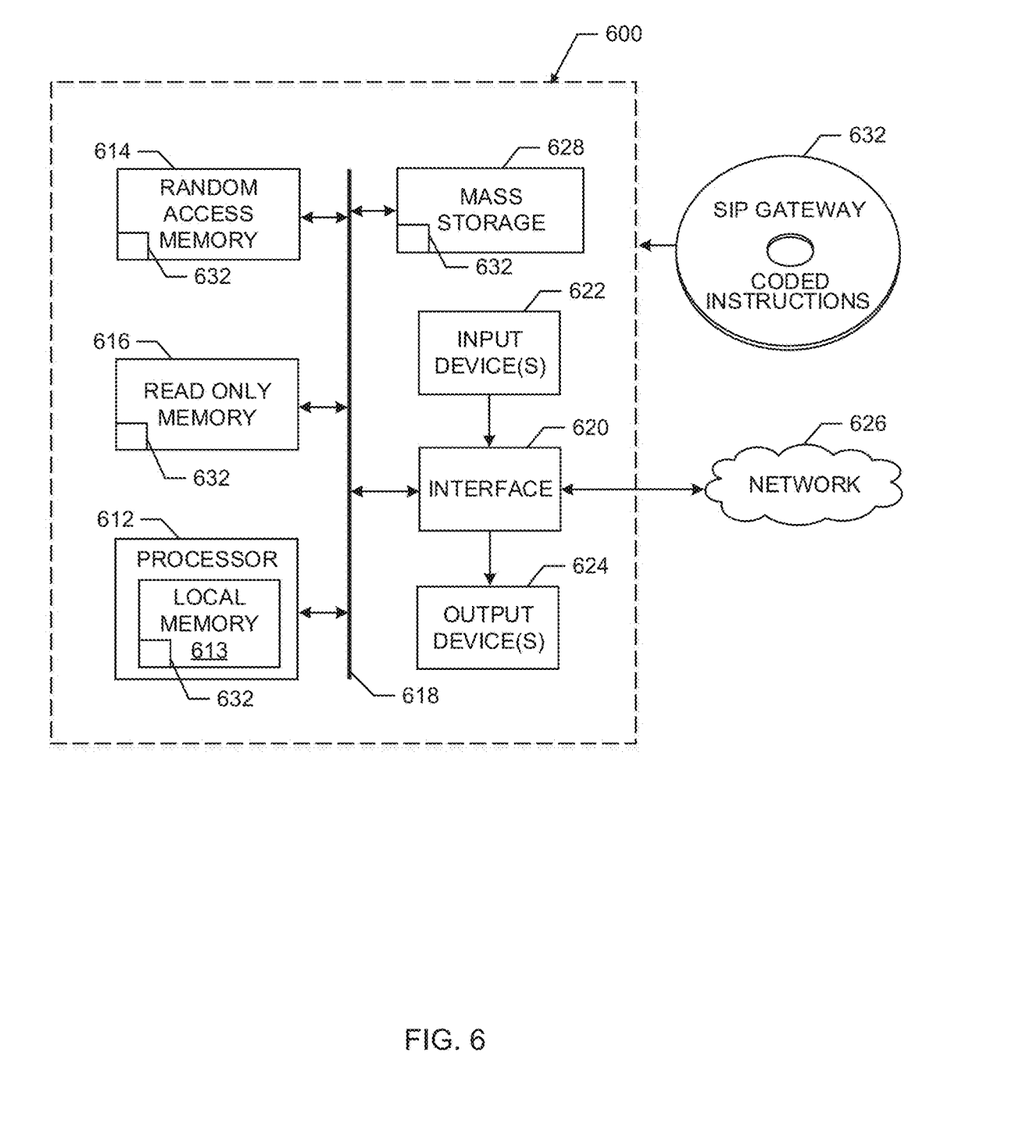
FIG. 6 is a block diagram of an example processor platform capable of executing the instructions of FIGS. F1 and/or F2 to implement the A1 of FIG. B.

FIG. 6 is a block diagram of an example processor platform 600 capable of executing the instructions of FIG. 4 or 5 to implement the SIP gateway 110 of FIG. 2. The example processor platform 600 may be or may be included in any type of apparatus, such as a server, a personal computer, an Internet appliance, or any other type of computing device (such as any component of the service provider 120).

The processor platform 600 of the illustrated example of FIG. 6 includes a processor 612. The processor 612 of the illustrated example is hardware. For example, the processor 612 can be implemented by at least one integrated circuit, logic circuit, microprocessor or controller from any desired family or manufacturer.

The processor 612 of the illustrated example includes a local memory 613 (e.g., a cache). The processor 612 of the illustrated example is in communication with a main memory including a volatile memory 614 and a non-volatile memory 616 via a bus 618. The volatile memory 614 may be implemented by any type of random access memory device, such as Dynamic Random Access Memory (DRAM). The non-volatile memory 616 may be implemented by flash memory and/or any other desired type of memory device.

The processor platform 600 of the illustrated example also includes an interface 620. The interface circuit 620 may be implemented by any type of interface standard, such as an Ethernet interface, a universal serial bus (USB), and/or a peripheral component interconnect (PCI) express interface.

In the illustrated example, at least one input device 622 is connected to the interface circuit 620. The input device(s) 622 permit(s) a user to enter data and commands into the processor 612. The input device(s) can be implemented by, for example, an audio sensor, a microphone, a keyboard, a button, a mouse, a touchscreen, a track-pad, a trackball, and/or a voice recognition system.

At least one output device 624 is also connected to the interface circuit 620 of the illustrated example. The output device(s) 624 can be implemented, for example, by display devices (e.g., a light emitting diode (LED), an organic light emitting diode (OLED), a liquid crystal display, a cathode ray tube display (CRT), a touchscreen, a tactile output device, a light emitting diode (LED), and/or speakers). The interface circuit 620 of the illustrated example, thus, may include a graphics driver card, a graphics driver chip or a graphics driver processor.

The interface circuit 620 of the illustrated example also includes a communication device such as a transmitter, a receiver, a transceiver, a modem and/or network interface card to facilitate exchange of data with external machines (e.g., computing devices of any kind) via a network 626 (e.g., an Ethernet connection, a digital subscriber line (DSL), a telephone line, coaxial cable, a cellular telephone system, etc.).

The processor platform 600 of the illustrated example also includes at least one mass storage device 628 for storing executable instructions (e.g., software) and/or data. Examples of such mass storage device(s) 628 include floppy disk drives, hard drive disks, compact disk drives, Blu-ray disk drives, RAID systems, and digital versatile disk (DVD) drives.

The coded instructions 632 of FIG. 4 or 5 may be stored in the mass storage device 628, in the local memory 613 in the volatile memory 614, in the non-volatile memory 616, and/or on a removable tangible computer readable storage medium such as a CD or DVD.

From the foregoing, it will be appreciated that the above disclosed methods, apparatus and articles of manufacture enable voice calls using virtual numbers (non-routable numbers or non-geographically assigned numbers) assigned to mobile devices. Accordingly, calling devices (e.g., the client 130) may contact mobile devices (e.g., the mobile device 140), by dialing virtual numbers assigned to the mobile devices and hold SIP and RTP communication sessions without utilizing a PSTN.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. A method comprising:
   receiving a request from a calling device to establish a communication session between a mobile device and the calling device, the mobile device assigned a virtual telephone number;
   retrieving location information corresponding to a location of the mobile device from a location register; and
   in response to the determination that the calling device is authorized to call the mobile device, sending, by a processor, a redirect to a session border controller (SBC) to establish the communication session between the calling device and the mobile device based on the location information without routing the communication session through a public switched telephone network (PSTN).

2. The method as defined in claim 1, establishing the communication session between the calling device and the mobile device via a mobile switching center of a service provider, the mobile switching center providing the location information to the location register.

3. The method as defined in claim 1, wherein the request comprises a session initiation protocol (SIP) invite and the communication session comprises a voice call.

4. The method as defined in claim 1, wherein the redirect comprises an Internet Protocol (IP) address of a serving mobile switching center of the mobile device and a temporary location directory number (TLDN) assigned to the mobile device.

5. The method as defined in claim 1, wherein the location information is retrieved via a Signaling System Number 7 (SS7) request.

6. The method as defined in claim 1, wherein the calling device comprises an enterprise session initiation protocol private branch exchange server.

7. The method as defined in claim 1, wherein the request is received via the session border controller (SBC) of a service provider in response to an invite from the calling device and the communication link is established between the calling device and the mobile device via the session border controller.

8. An apparatus comprising:
   a request receiver to receive a request to establish a communication session between a calling device and a mobile device, the request comprising a virtual number assigned to the mobile device;
   a location retriever to retrieve location information of the mobile device from a location register of a service provider; and
   a redirect generator to, in response to a determination that the calling device is authorized to call the mobile device, send a redirect to a session border controller of the service provider to establish the communication session between the calling device and the mobile device based on the location information using just a session initiation protocol (SIP) or a real-time transfer protocol (RTP).

9. The apparatus as defined in claim 8, wherein the location of the mobile device comprises an internet protocol (IP) address of a serving mobile switching center of the mobile device and a temporary location directory number (TLDN) of the mobile device.

10. The apparatus as defined in claim 8, wherein the redirect comprises instructions to reissue a session initiation protocol (SIP) invite between the session border controller and a serving mobile switching center of the mobile device.

11. A non-transitory computer readable storage medium comprising instructions that, when executed, cause a machine to at least:
    receive, from a session border controller of a service provider, a session initiation protocol invite to route a call between a mobile device assigned a virtual number and a calling device;
    determine location information of the mobile device; and
    in response to a determination that the calling device is authorized to call the mobile device, sending a redirect message to route the call between the mobile device and the calling device using session initiation protocol via the session border controller of the service provider without routing the communication session through a public switched telephone network (PSTN).

12. The non-transitory computer readable storage medium of claim 11, wherein the location information comprises an internet protocol (IP) address of a serving mobile switching center in communication with the mobile device, and the call is routed through the serving mobile switching center.

13. The non-transitory computer readable storage medium of claim 11, wherein the instructions, when executed, cause the machine to determine the location information by:
    requesting, via a Signaling System Number 7 (SS7) request, the location information from a location register, the location register having received the location information from a serving mobile switching center in communication with the mobile device; and
    receiving the location information from the location register.

* * * * *